US012205092B2

(12) United States Patent
Miller et al.

(10) Patent No.: US 12,205,092 B2
(45) Date of Patent: *Jan. 21, 2025

(54) ADMINISTERING AND AUTOMATING A SPONSORED EMERGENCY SAVINGS PROGRAM

(71) Applicant: SECURE, INC., Kirkland, WA (US)

(72) Inventors: Devin Miller, North Bend, WA (US); Bassam Saliba, Kirkland, WA (US); Zachary Scott Shannon, Denver, CO (US); Elaine Gilbert Levey, Seattle, WA (US); Gopal Annasundaram, Sammamish, WA (US)

(73) Assignee: SECURE, INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,715

(22) Filed: Jul. 26, 2023

(65) Prior Publication Data

US 2024/0062174 A1    Feb. 22, 2024

Related U.S. Application Data

(63) Continuation of application No. 17/551,060, filed on Dec. 14, 2021, now Pat. No. 11,748,720.
(Continued)

(51) Int. Cl.
*G06Q 20/10*    (2012.01)
(52) U.S. Cl.
CPC .................. *G06Q 20/108* (2013.01)
(58) Field of Classification Search
CPC ............. G06Q 20/108; G06Q 20/405
See application file for complete search history.

(56) References Cited

U.S. PATENT DOCUMENTS

| 7,634,436 | B1 * | 12/2009 | Wagner | G06Q 40/04 705/37 |
| 2002/0046204 | A1 * | 4/2002 | Hayes | G06F 16/22 |

(Continued)

FOREIGN PATENT DOCUMENTS

| AU | 2015302225 A1 * | 3/2017 | ......... G06Q 20/0855 |
| CA | 2773902 A1 * | 10/2012 | ............. G06Q 40/06 |

(Continued)

OTHER PUBLICATIONS

UT Austin: Frequency Tables, Pie Chart, and Bar Charts, 2015, pp. 1-3 (Year: 2015).*

(Continued)

*Primary Examiner* — Bijendra K Shrestha
(74) *Attorney, Agent, or Firm* — Richard Thomas Black; FISHERBROYLES, LLP (57) ABSTRACT

At least one computer-readable medium on which are stored instructions that, when executed by one or more processing devices, enable the one or more processing devices to perform a method. The method includes the steps of receiving over a network a request from an employing entity to facilitate an automatic savings program including savings accounts for employees of the employing entity, receiving over the network a request from an employee to participate in the automatic savings program, automatically routing at predetermined time intervals an employee-selected amount of the employee's wages to a savings account of the employee, receiving at least one request over the network from the employee to transfer funds from the savings account of the employee to an employee-designated destination, and initiating the requested fund transfer.

7 Claims, 11 Drawing Sheets

Related U.S. Application Data (60) Provisional application No. 63/199,212, filed on Dec. 14, 2020.

(56) References Cited

U.S. PATENT DOCUMENTS

| | | | | |
|---|---|---|---|---|
| 2013/0060717 A1* | 3/2013 | Messier | ............... | G06Q 40/06 705/36 R |
| 2013/0138578 A1 | 5/2013 | Epstein | | |
| 2014/0021252 A1 | 1/2014 | Brennan | | |
| 2016/0019137 A1* | 1/2016 | Ellis | ............... | G11C 16/10 711/103 |
| 2021/0133895 A1* | 5/2021 | Schekall | ............. | G06F 16/2282 |
| 2021/0250307 A1* | 8/2021 | Pal | ........................... | H04L 67/61 |

FOREIGN PATENT DOCUMENTS

| | | | | | |
|---|---|---|---|---|---|
| EP | 0-590-645 | * | 9/1993 | ............ | G06F 12/02 |
| WO | WO-2008030590 A2 | * | 3/2008 | ............ | G06Q 10/10 |
| WO | WO-2012161796 A1 | * | 11/2012 | ............ | G06Q 40/00 |

OTHER PUBLICATIONS

The Daily Trust (Ahuja): Top Ways to Saving Your Money, Aug. 7, 2007, Dialog Archives, pp. 1-2 (Year: 2007).*

Grensing-Pophal, Lin: Emergency Saving Accounts Funded by Payroll Deductions Boost Financial Wellness, Sep. 14, 2020, pp. 1-6. (Year: 2020).*

Beshears et al.: Building Emergency Savings Through Employer Sponsored Rainy-Day Saving Accounts, Nov. 2019, National Bureau of Economic Research, Cambridge, MA, pp. 1-72 (Year: 2019).*

Min, Sarah: More Big Companies Helping Workers Auto-Save to Build Emergency Funds, Jun. 19, 2019, Money Watch, CBS news, pp. 1-9 (Year: 2019).*

Miller, Devin: How do ESAs compare to 401(k), IRA, and other retirement plans? Jul. 26, 2021, Blog Post, Secure Save, pp. 1-8 (Year: 2021).*

* cited by examiner

Get emergency money

How much do you need?

Amount

300             $1,256.00

In your account

⬇

Get $300

How would you like to receive your funds?

Transfer to Wells Fargo Savings
It will take 1-2 days to transfer $300.00 to your Wells Fargo Savings account

Transfer to First Tech CU
It will take 1-2 days to transfer $300.00 to your First Tech CU account

CONFIRM TRANSACTION

*Fig. 7*

§ SecureSave   Home   Activity   Plan

Tom Johnson
Personal

⬭ GET EMERGENCY MONEY

Your emergency savings

Latest activity View all activity ⇨

| Money withdrawn | $12.00 |
| 10/2/2021 | |

| Money withdrawn | $23.00 |
| 10/1/2021 | |

| Money withdrawn | $41.00 |
| 9/7/2021 | |

Plan   Manage plan ⇨

Auto savings
$34.00 per paycheck
You're earning $25.00 match
from Saliba Org per paycheck
$70.00 earned so far

$882.00
out of $2500.00

↻ Review your pending invitation.    ⋀

*Fig. 8A*

SecureSave    Home    Activity    Plan      (GET EMERGENCY MONEY)      Tom Johnson Personal

Emergency Savings
$882.00
As of 11/212021

(Add money)   (Get money)

🔍 Search transactions

Money withdrawn      $12.00
Oct 2, 2021     Transferred to *********5100
Child Care

Money withdrawn      $23.00
Oct 1, 2021     Transferred to *********5529
Legal Money withdrawn (Pending)      $41.00
Sep 7, 2021     Transferred to Plaid Checking
Appliance Money withdrawn (Pending)      $50.00

ADMINISTERING AND AUTOMATING A SPONSORED EMERGENCY SAVINGS PROGRAM

PRIORITY CLAIM

This application claims priority to U.S. patent application Ser. No. 17/551,060 filed Dec. 14, 2021, which application claims priority to U.S. Provisional Application Ser. No. 63/199,212 filed Dec. 14, 2020, the entirety of each of which is hereby incorporated by reference as if fully set forth herein.

COPYRIGHT NOTICE

This disclosure is protected under United States and/or International Copyright Laws. © 2023 SECURE, INC. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Having a well-funded emergency savings account is at the heart of financial wellness. The ability to cover a financial setback or temporarily lapse in pay without having to borrow money or get a loan can reduce feelings of financial stress and even make people happier. According to a study from Northwestern Mutual, 92 percent of Americans said nothing makes them happier than having their finances in order.

But for too many, having a well-stocked emergency savings account can seem like a pipedream. A survey from Varo Money found that two-thirds of their clients 'sometimes' or 'constantly' feel stressed because they do not have a three-month emergency fund. Even those with a savings account usually don't have enough to cover most emergencies. A Federal Reserve survey found that almost 40 percent of participants wouldn't be able to cover an unexpected $400 expense using cash. A Bankrate poll found another 40 percent of Americans would need to borrow money to cover a $1,000 emergency. Even more dismal are findings from John Hancock's 2019 Financial Stress Survey, reporting that one quarter of Americans have no savings whatsoever, including 16 percent of baby boomers and 31 percent of Generations X, Y, and Z.

Not surprisingly, money is the dominant source of stress for 44 percent of Americans, causing "high" or "moderate" levels of anxiety, according to Northwestern Mutual. The National Endowment for Financial Education has also reported that 30 percent of U.S. adults are "constantly" worried about their financial situation. Fast forward two years to 2020 in the midst of a worldwide pandemic, and those levels have worsened. Almost 9 in 10 Americans said COVID-19 has caused stress on their personal finances.

If the majority of this financial anxiety stems from lack of savings, why aren't Americans saving more? It's not that they don't know the actions that can calm their concerns. The John Hancock survey found that most people knew taking steps such as setting financial goals (33 percent) or learning to live on less (31 percent) could reduce their financial concerns. But there was a notable gap between knowing the actions and taking action. Only 21 percent had actually set any financial goals, and a meager 20 percent had taken steps to live on less money. The answer, then, may lie in making saving money easier, which is what employer emergency savings accounts (ESAs) do by allowing workers to set aside a portion of every paycheck into a rainy day fund through automatic payroll deductions.

Such programs and emergency savings accounts overall, in their current form, have numerous flaws in their design and the administrative systems that support them, that reduce the ability of employers to offer them, individuals to use them and for providers to support them. These flaws generally fall into four core categories:

Ease and automation of employer administration. Making an emergency savings program easy to administer and support by an employer is key to the long term success of such a program. Current programs today require an excess of manual administrative time and are overly complicated in their nature.

Ease and automation of employee participation. To best support the goal of such programs, the initial introduction and ongoing maintenance of and access to an emergency savings program must be very easy for an individual and make the process of starting and continuing to save as easy and rewarding as possible.

Support for an individual during an emergency. An effective emergency savings program not only helps individuals save, but also supports the individual during an unexpected financial emergency Ease and automation of compliance and platform automation. National and state levels laws, along with general banking and financial elements that must be navigated to support such a program, requires a high level of automation and coordination between third parties to be successful.

DETAILED DESCRIPTION

This patent application is intended to describe one or more embodiments of the present invention. It is to be understood that the use of absolute terms, such as "must,"

"will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 1:
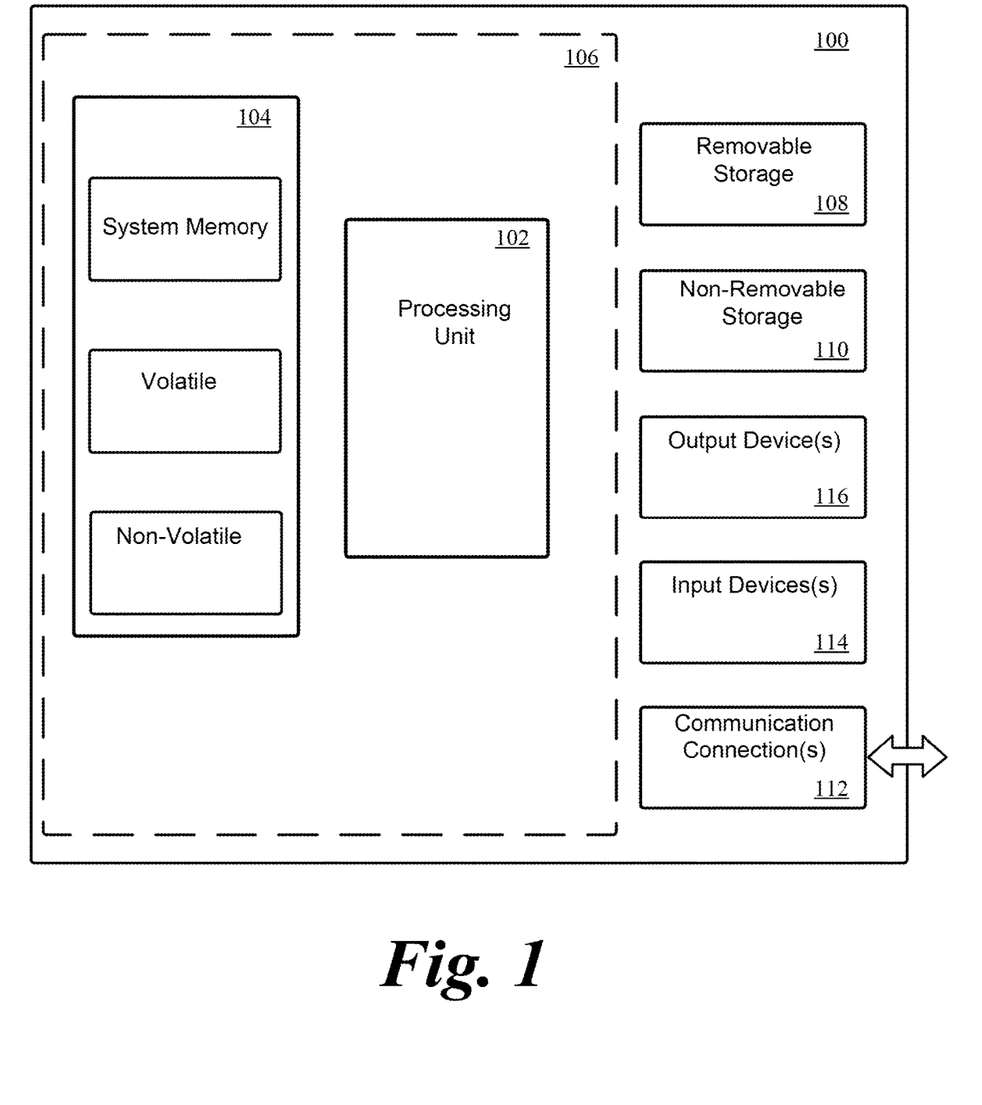
FIG. 1 is a schematic view of an exemplary operating environment in which an embodiment of the invention can be implemented.

With reference to FIG. 1, an exemplary system for implementing an embodiment of the invention includes a computing device, such as computing device 100, which, in an embodiment, is or includes a smartphone. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared, cellular and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
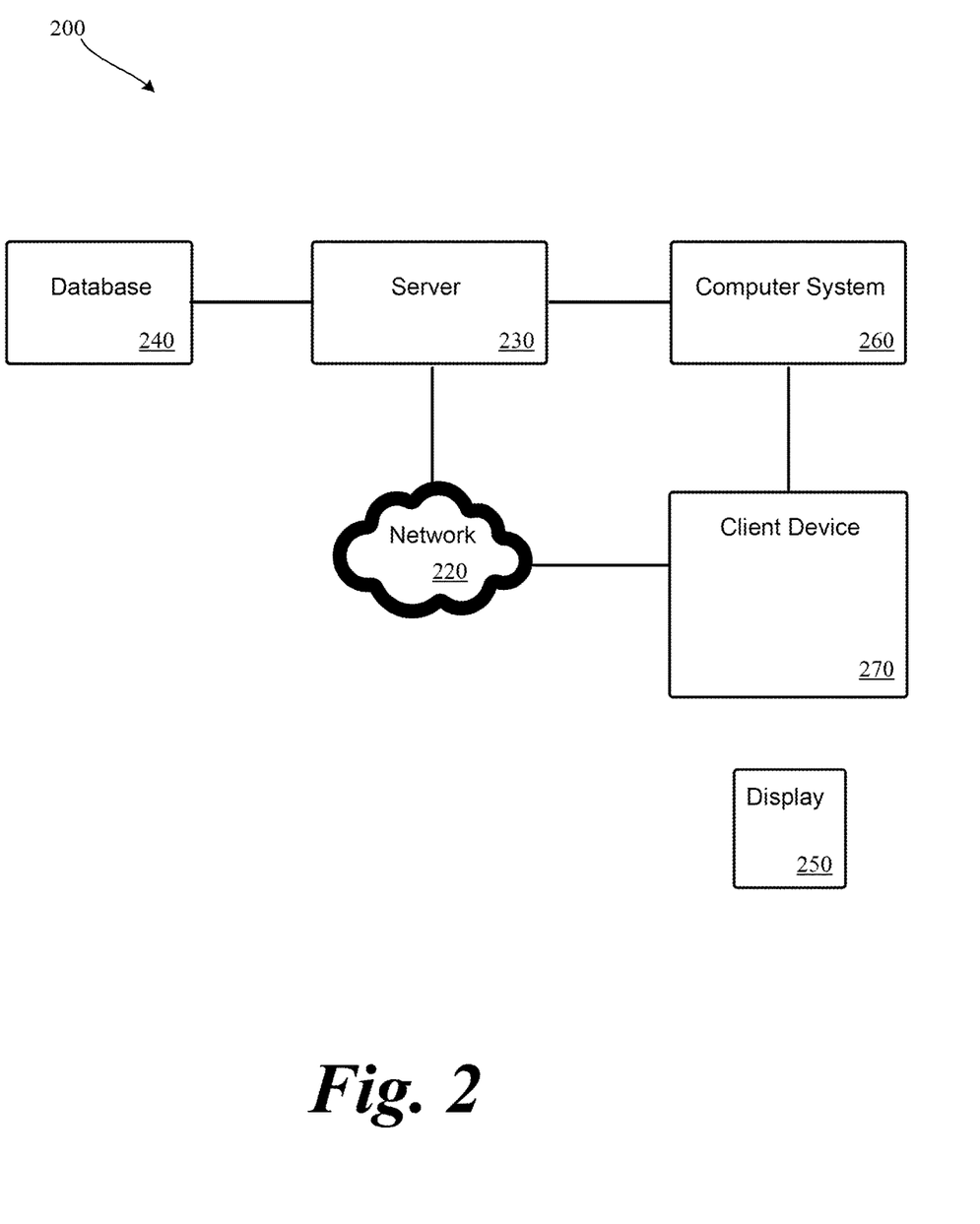
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200 that, in an embodiment, includes a server 230, database 240 and computer system 260. The system 200 may communicate with an electronic client device 270, such as a personal computer or workstation, virtual-reality (VR) image-capturing device (camera), tablet and/or smartphone, that is linked via a communication medium, such as a network 220 (e.g., the Internet), to one or more electronic devices or systems, such as server 230. The server 230 may further be coupled, or otherwise have access, to a database 240 and a computer system 260. Although the embodiment illustrated in FIG. 2 includes one server 230 coupled to one client device 270 via the network 220, it should be recognized that embodiments of the invention may be implemented using one or more such client devices coupled to one or more such servers.

The client device 270 and the server 230 may include all or fewer than all of the features associated with the device 100 illustrated in and discussed with reference to FIG. 1. The client device 270 includes or is otherwise coupled to a computer screen or display 250. The client device 270 may be used for various purposes such as network- and local-computing processes.

The client device 270 is linked via the network 220 to server 230 so that computer programs, such as, for example, a short message service (SMS) application, running on the client device 270 can cooperate in two-way communication with server 230. The server 230 may be coupled to database 240 to retrieve information therefrom and to store information thereto. Database 240 may have stored therein data (not shown) that can be used by the server 230 and/or client device 270 to enable performance of various aspects of embodiments of the invention. The data stored in database 240 may include, for example, records characterizing all transactions between sponsors, such as, for example, employers, employees and one or more embodiments of the invention. Additionally, the server 230 may be coupled to the computer system 260 in a manner allowing the server to delegate certain processing functions to the computer system. In an embodiment, most or all of the functionality described herein may be implemented in a desktop or smartphone application that may include one or more executable modules. In an embodiment, the client device 270 may bypass network 220 and communicate directly with computer system 260.

An embodiment provides an approach for best supporting and automating an emergency savings program for individuals. An effective emergency savings program may also include the involvement of an individual's sponsor or sponsors. Such a sponsor can be the individual's employer, a credit union, financial institution, insurance company or other entity that has a relationship with the individual. For purposes of discussing an exemplary embodiment only, such sponsor shall be referred to herein below as an employer. An effective emergency savings program likely supports an individual with saving for emergencies, but also in the event of an emergency where they must access funds saved. An embodiment describes the ways to best support the individual user who is trying to save for emergencies and navigate the unexpected situations that come up during which funds will be used. In an embodiment, the role of the employer in an emergency savings program can be automated and improved, and an embodiment can work to manage any regulatory- or compliance-related elements associated with an emergency savings program.

One or more embodiments may include the following elements described in greater detail herein:

Employer administration of an emergency savings program.

Employee savings automation and support for emergency savings and navigating financial hardships as part of an emergency savings program.

Program administration within an emergency savings platform.

Employer Administration of an Emergency Sayings Program

Auto-enrollment: In order to support the automation of an emergency savings program that uses auto-enrollment (opt-out) as the primary form of enrollment. There are a variety of state and federal compliance elements that can vary state by state.

Depending on the state in which the employee is employed and/or lives, an embodiment can automatically determine if an employee should be on an opt-in program or an opt-out program. An embodiment can also automatically manage compliance on behalf of the employer based on the state an individual is living in and whether an employee is presented with an opt-in or opt-out invitation and onboarding experience.

An embodiment can automatically manage the compliance requirements for opting in and the various deadlines and reminder deadlines related to auto-enrollment. This can also include automating the disclosures and other related details for an employer, again, with a focus on state-by-state details (or even country by country).

The ability to allow an employer to automatically offer an emergency savings program, which requires an employee to have the choice of which bank account to use. An embodiment can automatically manage this compliance element by defaulting to an account and then automating the selection, configuration and routing of funds to an account defined by an individual. In an embodiment, a user is defaulted (via opt in or optout) to the program, via payroll deferrals, as well as a preset savings amount and the funds are then routed automatically.

Matching strategy automation: Many employers seek to match the savings by an individual into an emergency savings program to help incentivize participation. An embodiment can automatically adjust the matching strategy for an employer or even individual employees for maximum impact of an emergency savings program.

An employer could designate an amount to invest, and an embodiment automatically defines the parameters of the program or strategy to be used. For example, a part time worker with uneven hours might have one strategy (such as a % of income saved) and a salaried worker might have another (such as a consistent dollar amount per pay period). The employer would not need to choose or adjust manually, just provide an amount and an embodiment can set what works best based on data and analysis, such as overall savings rates, retention and % of dollars used on emergencies.

An employer could choose a strategy and an embodiment recommends a dollar amount automatically. Based on data, an embodiment can query the employer about their employee base, and then recommend what strategy will have the greatest impact.

Situation or milestone-based matching: If an employer wanted to fund only specific events or milestones, an embodiment can ask about the employers employee base and the events or milestones that they want to fund and tell them how much to fund and which ones for a certain level of impact.

Tax automation: An embodiment can automate the claims process and documentation creation for Employee Hardship Funds, linking the charity and tracking the requisite details to be compliant with the IRS (or other governmental revenue agency), in an automated way so that claims clear faster. An embodiment can enable the ability for multiple bank accounts to be connected to the platform: for example, one to be used for regular matching and deferrals, and the other from a hardship fund. An embodiment can automatically determine which situation can require which account to be used.

Emergency savings gifting. When an employee suffers from an unexpected emergency, many employers will send the employee a gift such as flowers to show their sympathy and condolences. In other situations, employers often gift their employers during holidays, special events, or for example when the company reaches a certain financial milestone. Rather than sending chocolate or flowers when an employee has an emergency (e.g., surgery), or provide often unused gifts (watches, plaques, food baskets, etc.), the company can simply deposit a $100 gift into the employee's emergency savings account. An embodiment could also limit the use of these funds to a specific purpose. An embodiment can make this process automatic based on the claims process an employee goes through.

Intelligence for Benefit Decisions. An embodiment can allow companies to optimize their benefit offerings based on the financial needs of their employees. An embodiment could do this automatically by presenting benefit programs and concepts to the employee during the claims process or based on historical use of the employees claims. An embodiment could also proactively recommend benefits or resources to an employee prior to a claim by doing a look alike in our platform for similar employee profiles.

Long term workplace savings companion: An effective emergency savings program works as a companion of a long-term savings program offered by an employer, such as a 401(k). An embodiment automatically detects the appropriate level of emergency savings for an employee and then once attained, will automatically stop any deferrals into the program, and direct those towards a 401(k) or other long-term savings program. If the emergency savings is used, in part or whole, the deferral from the paycheck will go back to the emergency savings program, in part or in whole, until the desired level of savings is attained. An embodiment can integrate with the payroll system enabling the employer to adjust how the employee's deduction is allocated, and what the corresponding company match should be across the various benefits.

Employee Savings Automation and Support for Emergency Savings and Navigating Financial Hardships as Part of an Emergency Savings Program Personalized savings target: An embodiment could query the user about themselves, their situation and other personal and financial details, and then use existing and historical data on emergencies and other savings goals to create a savings plan. Such data may be stored in database 240. This plan can provide a target number and show risk elements that are most likely (ex: broken car, health and medical, loss of wages, etc.). This plan and the associated risk factors could also automatically change and notify the user of ways they could improve and adjust their savings target or deferral amount. This data could also be used to educate employers on the aggregate risks for employees, the impact they could have on an employer and how to mitigate them in the program or with other benefits.

Claims/Resource matching: An embodiment uses historical data on emergency claims, leveraging an employer's benefit guide and a catalogue of proprietary resources to match resources and content to users in a claim. Such data may be stored in database 240. An embodiment uses an employer's and/or employee's personal profile, data from the application (location data, etc.), data from other emergencies and available content to recommend resources. An embodiment can use the aggregate data to then recommend new benefits automatically to employers that they lack.

Payment processing based on the claim: If a user is making a claim, based on the situation, an embodiment could recommend different funding mechanisms. For example, if it is a broken car, an embodiment could highlight an instant loan or virtual card, where if it is for travel reimbursement, an embodiment can recommend an ACH payment or other means for accessing emergency savings such as cash, direct debit transfers or other approaches. An embodiment could also highlight an employee hardship fund grant or other sources of cash such as a 401K hardship withdrawal.

Figure 8A:
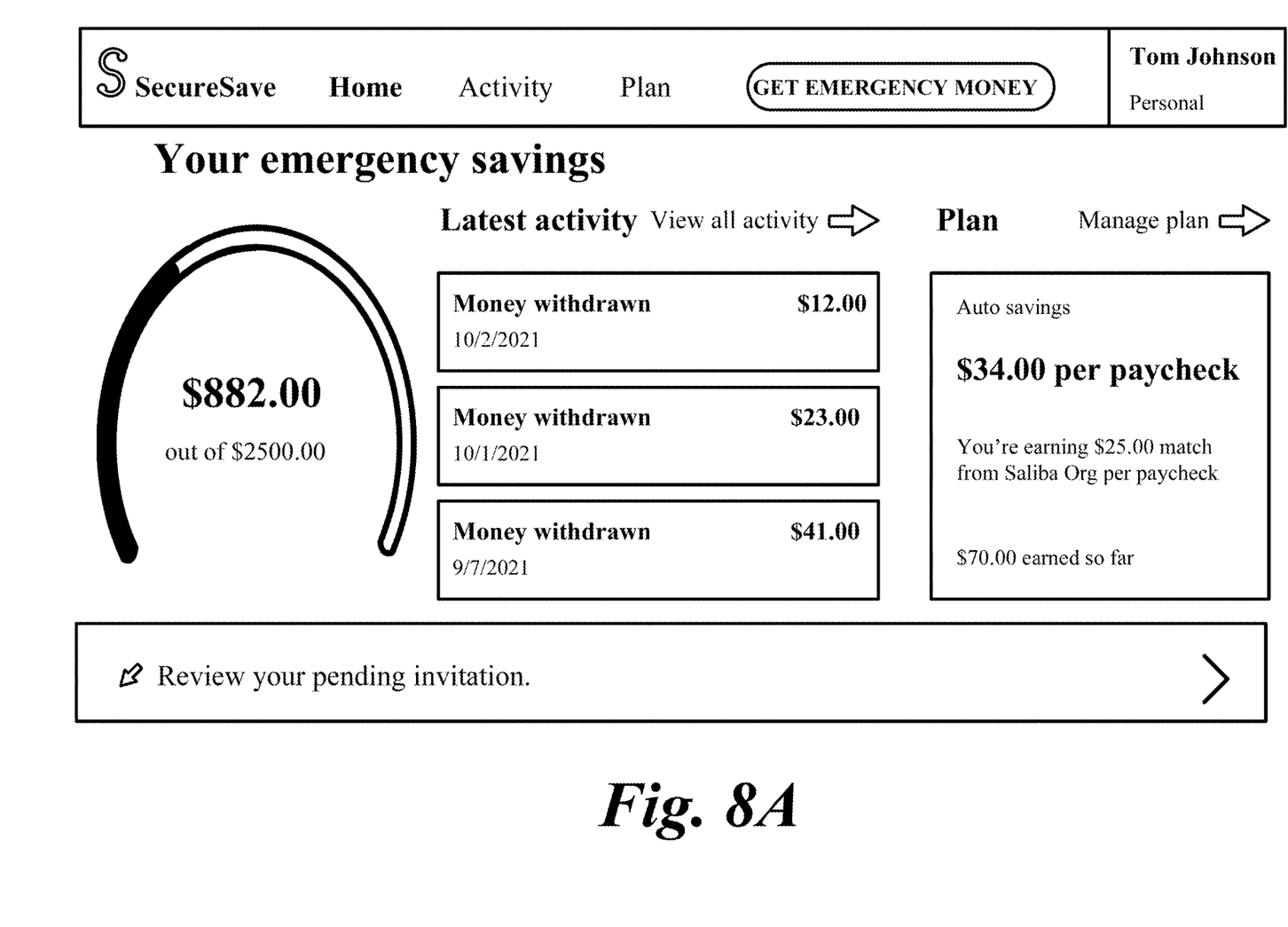
FIGS. 8A-8B are screenshots illustrating features of an embodiment of the invention.
Figure 8B:
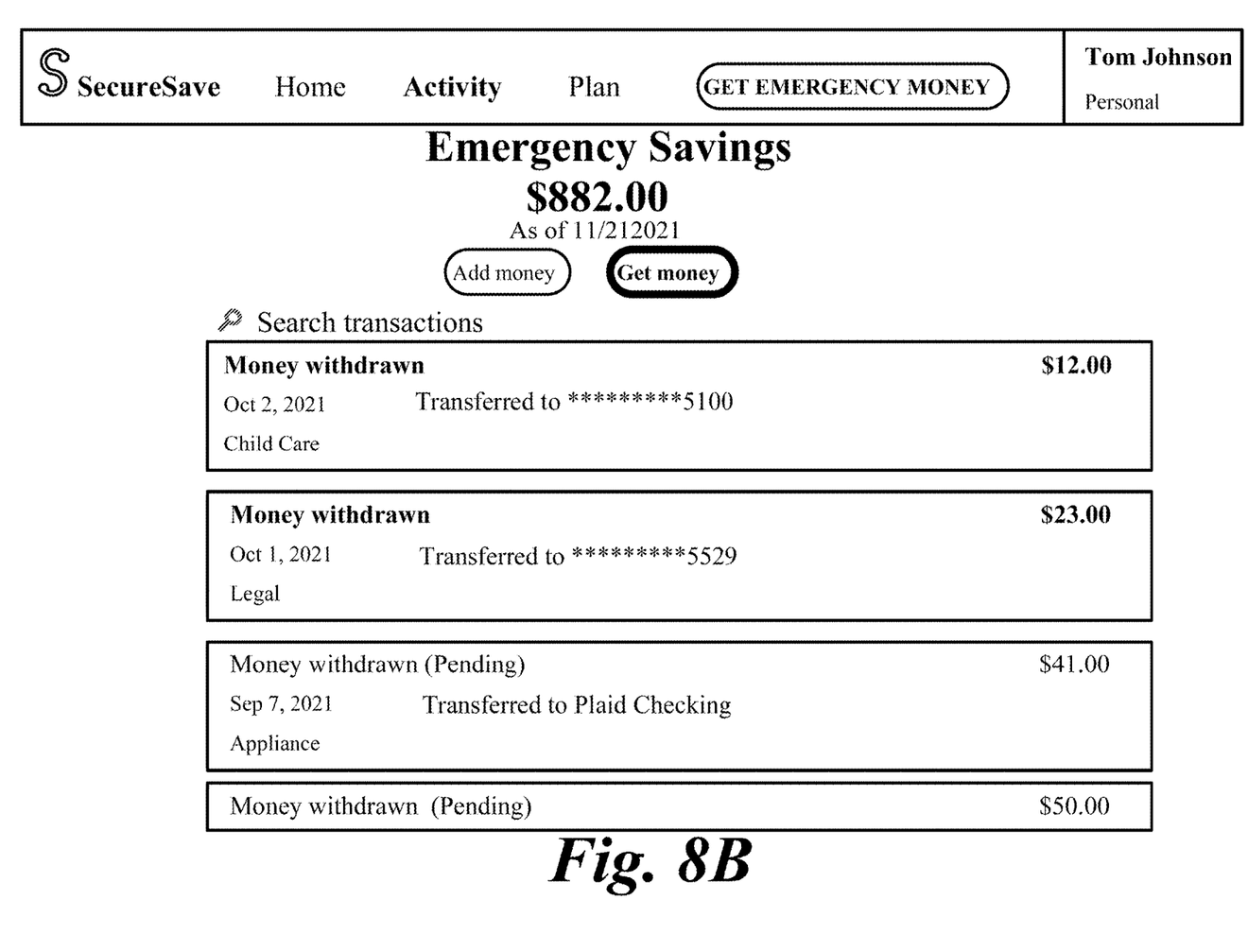

Dynamic reallocation of deduction. Referring to FIGS. 8A-8B, and in an embodiment, a user can set the deduction to shift from emergency savings to long term retirement saving as the emergency fund reaches or approaches a predetermined target amount, then if it dips below, the deduction can be reallocated back to the emergency account until it reaches the threshold, and so on.

Automatic loan payoff. This feature is valuable for getting people off the payday loan/credit card treadmill or student loans. Again, our invention can allow user to automatically redirect part of their emergency savings above a certain threshold to automatically pay off such loans. An embodiment can recommend the optimal saving threshold and payoff schedule.

Loan program based on emergency savings claims process: When a user is requesting funds for an emergency, an embodiment can use available data (including, e.g., historical deferral deposit history and past claims) to support the underwriting of a loan, specific to the situation or emergency the employee is claiming.

Community. An embodiment allows users to request help from one or more co-workers (i.e., allow employee to send money to a coworker). An embodiment allows a co-worker to 'start a collection' on behalf of another coworker. An embodiment allows an employee to redirect his match for the next predetermined number of paychecks to a co-worker. Program Administration within an Emergency Savings Platform Custodian routing: At scale, an emergency savings program is going to have multiple custodians and banking partners. An embodiment could automate the routing of funds based on the employer they work with and the payment processing strategy required. This is to ensure the employee can maximize their match and incentives from multiple employers and still maintain the highest rate of liquidity.

Treasury management. Allocating funds into a small amount of assets and majority into stable value funds, but use a line-of-credit backed by the stable value funds make assets 'liquid'. Also, an embodiment can connect to a variety of custodians and financial products to dynamically set the lowest volatility, for the highest return and with the greatest liquidity to ensure users in an emergency savings program have the greatest access to funds, with the greatest incentive to save and the lowest volatility to protect their savings.

Multiple-employers: How to manage having multiple employers supporting an employee. An embodiment can allow the employee to link multiple employers, turn them on and off and automatically manage the match. An embodiment can work well with seasonal roles and part time gig worker roles.

Employee connectivity: An embodiment allows the employee to disconnect from the employer savings program and reconnect later. This allows them to control which employee they are connected to as part of an emergency savings program (including multiple at the same time). This is designed specifically for seasonal or part time workers who come and go frequently and to ensure fast signup on subsequent hiring by the same employer.

Additionally, an embodiment can keep track of the following metrics in order to help evaluate benefits of the autosave program for employees:

Employee satisfaction with the program in the form of a net promoter score assessed via feedback surveys and core program engagement metrics such as average savings balance, average payroll deferral amount and use of funds.

Figure 6:
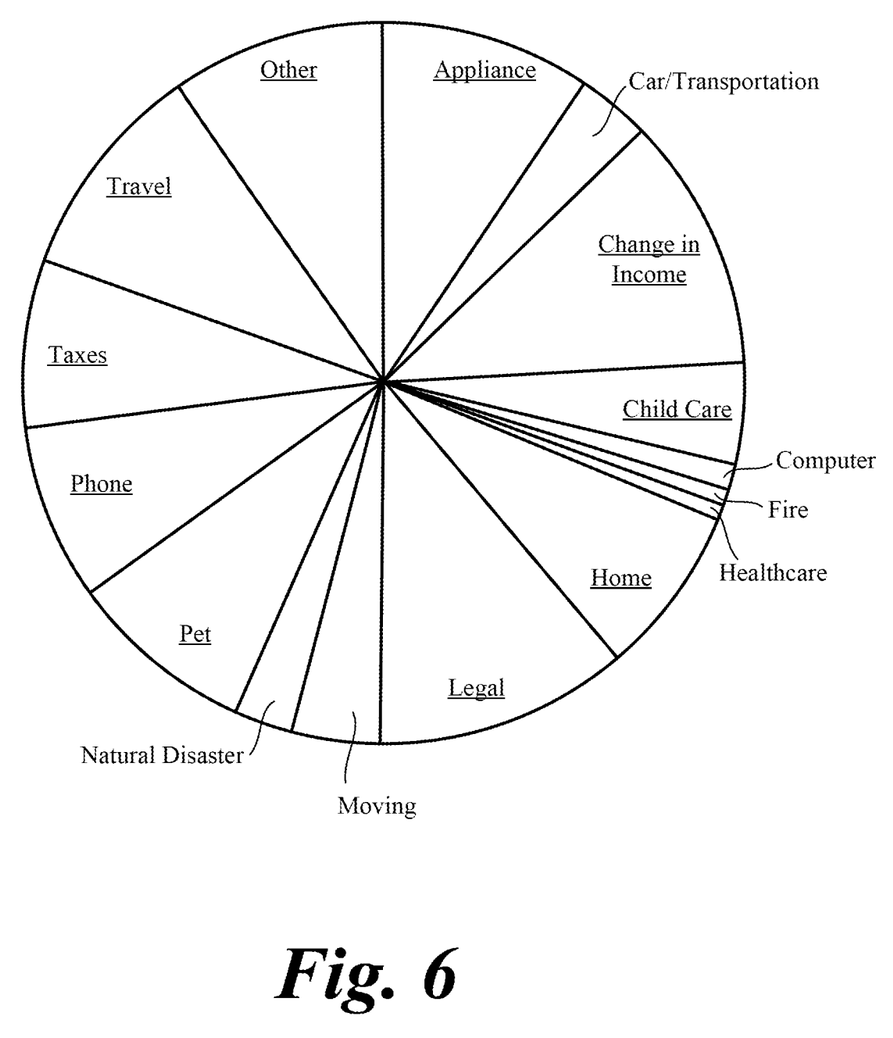
FIG. 6 is a pie chart illustrating a graphical user interface showing the frequency with which reasons for employee fund withdrawal are received according to an embodiment.

Percentage of the total usage of funds used for the specified purpose of emergency savings and unexpected financial hardships. Ideally, and in an embodiment, 75% or more of the funds are used for predefined declared "emergencies". FIG. 6 illustrates a pie chart indicating a frequency with which employees cite particular reasons for requesting withdrawal from their FBO accounts.

Total savings realized in aggregate as well as the average per employee during participation in the program and average savings percentage of salary monthly per participant.

Number of employees (i) for whom accounts are opened at the designated institution (after notice and opportunity to opt out); (ii) who identify their own institutions; and (iii) who opt out of the program entirely.

Number of employees who maintain their accounts at the designated institution for a minimum period (e.g., one year) compared to those who move their accounts to another institution.

All of the above features and functions can be achieved by elements of system 200 tracking how much memory associated with database 240, server 230, computer system 260 and/or client device 270 is allocated to collecting and receiving data used to facilitate such features and functions.

Figure 3:
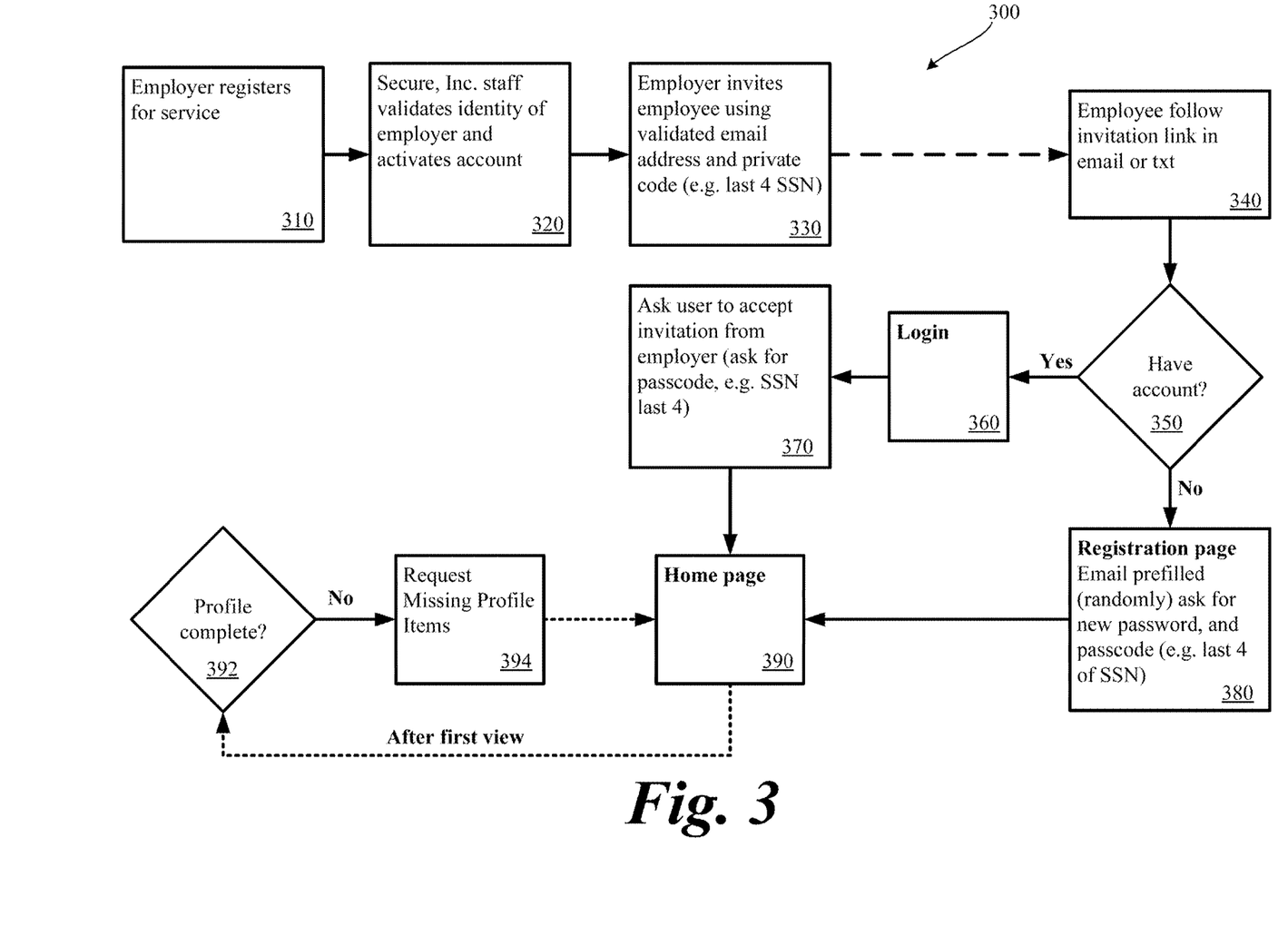
FIG. 3 illustrates a process for onboarding sponsors and employees onto a platform according to an embodiment of the invention.

FIG. 3 illustrates a process 300, according to an embodiment of the invention, for onboarding employers and employees onto a platform functioning to achieve the objectives of the invention discussed above herein. The process 300 is illustrated as a set of operations shown as discrete blocks. One or more steps of the process 300 may be implemented in any suitable hardware, software, including instructions embodied within components, firmware, or combination thereof and enabled by data calls to database 240 from one or more of client device 270, server 230 and computer system 260. The order in which the operations associated with the process 300 are described is not to be necessarily construed as a limitation.

The process 300 addresses the manner in which employers and employees are onboarded onto the platform according to an embodiment. Validated employers invite employees to register for the secure service using a previously validated email account. Employers may also specify a private passcode for the employee to enter at the time of registration to validate that the user is in fact the employee. Often, the private passcode will be the last 4 digits of the employees Social Security Number but could be another shared private number such as a DOB, for example.

At a block 310, an employer intending to use an embodiment of the invention registers with server 230 to do so via, for example, a client device 270 such as that illustrated in FIG. 2.

At a block 320, a proprietor of one or more embodiments of the invention provides validation of the employer and activates one or more accounts to facilitate practice of the invention.

At a block 330, the employer electronically invites an employee to participate in use of the invention. The employer may do so by using an email address of the employee validated by the proprietor and in conjunction with a code, such as SSN, associated with and identifying the employee.

At a block 340, the invited employee accepts the invitation from the employer. This acceptance may be done by, for example, the employee selecting a link in an email or SMS message associated with the electronic invitation.

At a block 350, server 230 determines whether the invited employee has a currently existing account. If yes, process 300 proceeds to block 360 at which time the employee is able to provide login information so as to accept the employer's invitation at a block 370.

Upon acceptance of the invitation by the employee, at a block 390 the employee is directed to a home webpage allowing the employee to view and manage the employee's account.

If the employee does not have an account at block 350, the employee is directed to a registration page allowing the employee to register to participate in use of the invention. This step may require the employee to provide information identifying the employee, as well as authenticating information such as a password. The process 300 then proceeds to step 390.

At a step 392, server 230 determines whether the employee's profile is sufficiently complete to allow the employee to control his/her account. If the profile is not sufficiently complete, then, at a step 394, an embodiment notifies the employee that information required to control such an account is required. Once such required information is provided by the employee, the process proceeds to step 390.

Figure 4:
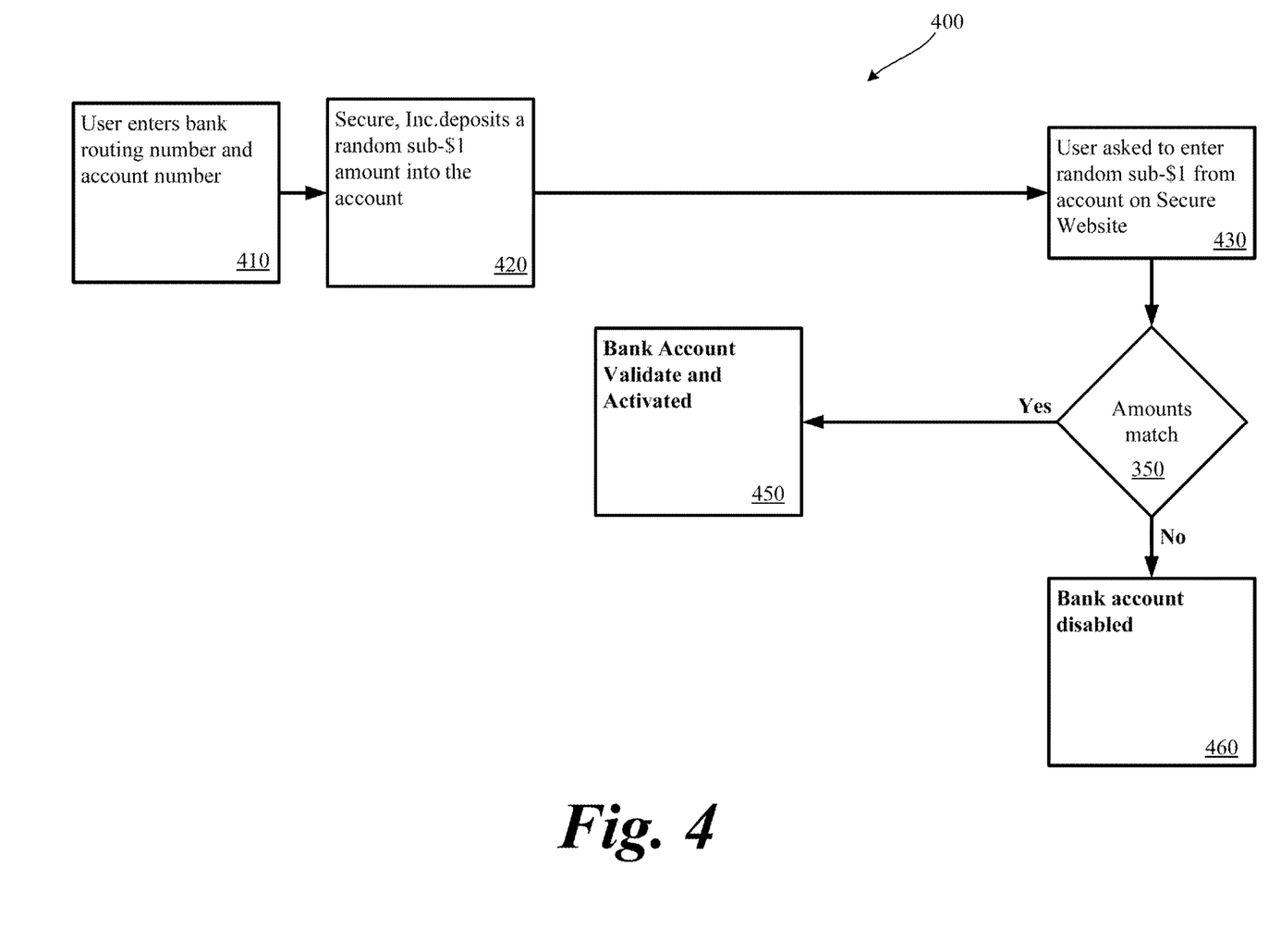
FIG. 4 illustrates a process for validating employees' bank accounts according to an embodiment of the invention.

FIG. 4 illustrates a process 400, according to an embodiment of the invention, for validating employees' bank accounts functioning to achieve the objectives of the invention discussed above herein. The process 400 is illustrated as a set of operations shown as discrete blocks. One or more steps of the process 400 may be implemented in any suitable hardware, software, including instructions embodied within components, firmware, or combination thereof and enabled by data calls to database 240 from one or more of client device 270, server 230 and computer system 260. The order in which the operations associated with the process 400 are described is not to be necessarily construed as a limitation.

At a step 410, an employee desiring to participate in use of the invention provides information identifying the bank account that they would like to use for the above-discussed savings functionality. For example, the employee may provide to server 230 using client device 270 the routing number and account number associated with the bank account to be used.

At a step 420, an administrator of an embodiment of the invention that is in control of database 240, server 230 and computer system 260 deposits using server 230 an amount of money, which may be a random amount and less than $1, into the account associated with the information provided by the employee at step 410 in order to verify the validity of the employee's account.

At a step 430, the user is requested via, for example, client device 270 to review their account to identify the deposit into the account by the administrator at step 420 and enter the value of that deposited amount on a website provided by the administrator.

At a step 440, the value entered by the employee at step 430 is compared with the amount deposited by the administrator at step 420. If the value and the deposited amount match, then, at a step 450, the employee's account is validated and activated. If, on the other hand, the value and amount do not match, then, at a step 460, the employee's account is disabled from participation in use of the invention.

Figure 5:
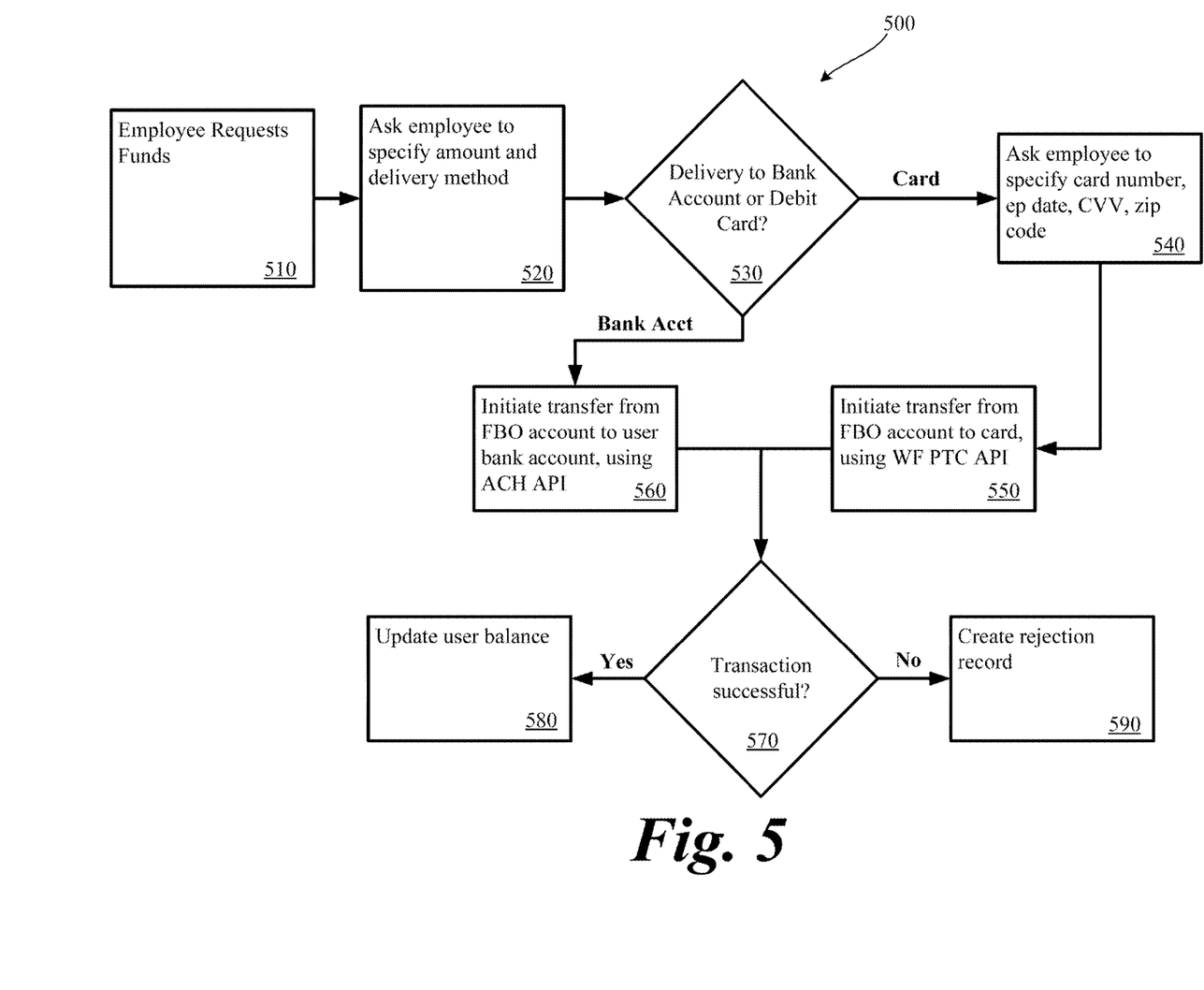
FIG. 5 illustrates a process for facilitating the transfer of funds from an employee's savings account maintained by the administrator of an embodiment of the invention to the employee's validated bank accounts and/or debit card according to an embodiment of the invention.

FIG. 5 illustrates a process 500, according to an embodiment of the invention, for facilitating the transfer of funds from an employee's savings account ("FBO account") maintained by the administrator of an embodiment of the invention to the employee's validated bank accounts and/or debit card. The process 500 is illustrated as a set of operations shown as discrete blocks. One or more steps of the process 500 may be implemented in any suitable hardware, software, including instructions embodied within components, firmware, or combination thereof and enabled by data calls to database 240 from one or more of client device 270, server 230 and computer system 260. The order in which the operations associated with the process 500 are described is not to be necessarily construed as a limitation.

At a step 510, the employee using, for example, client device 270 requests disbursement of funds from the savings account of an embodiment. This request may be received at, for example, server 230 or computer system 260.

At a step 520, the administrator requests that the employee specify the amount of the requested disbursement and the target destination of the disbursed funds.

At a step 530, an embodiment identifies the target destination selected by the employee. If the employee designates their debit card as the target destination, then, at a step 540, the administrator asks the employee to specify, for example, the debit card number, expiration date, CVV and/or the employee's zip code. Subsequently, at a step 550, the administrator initiates transfer of the funds requested by the employee from the employee's FBO account to the debit card.

If the employee designates their bank account as the target destination, then, at a step 560, the administrator initiates transfer of the funds requested by the employee from the employee's FBO account to the bank account.

At a step 570, an embodiment determines whether the transfer of the requested funds was successful. If the transfer was successful, then, at a step 580, the balance of the employee's FBO account is updated. If the transfer was not successful, then, at a step 590, a rejection record is created.

Figure 7:
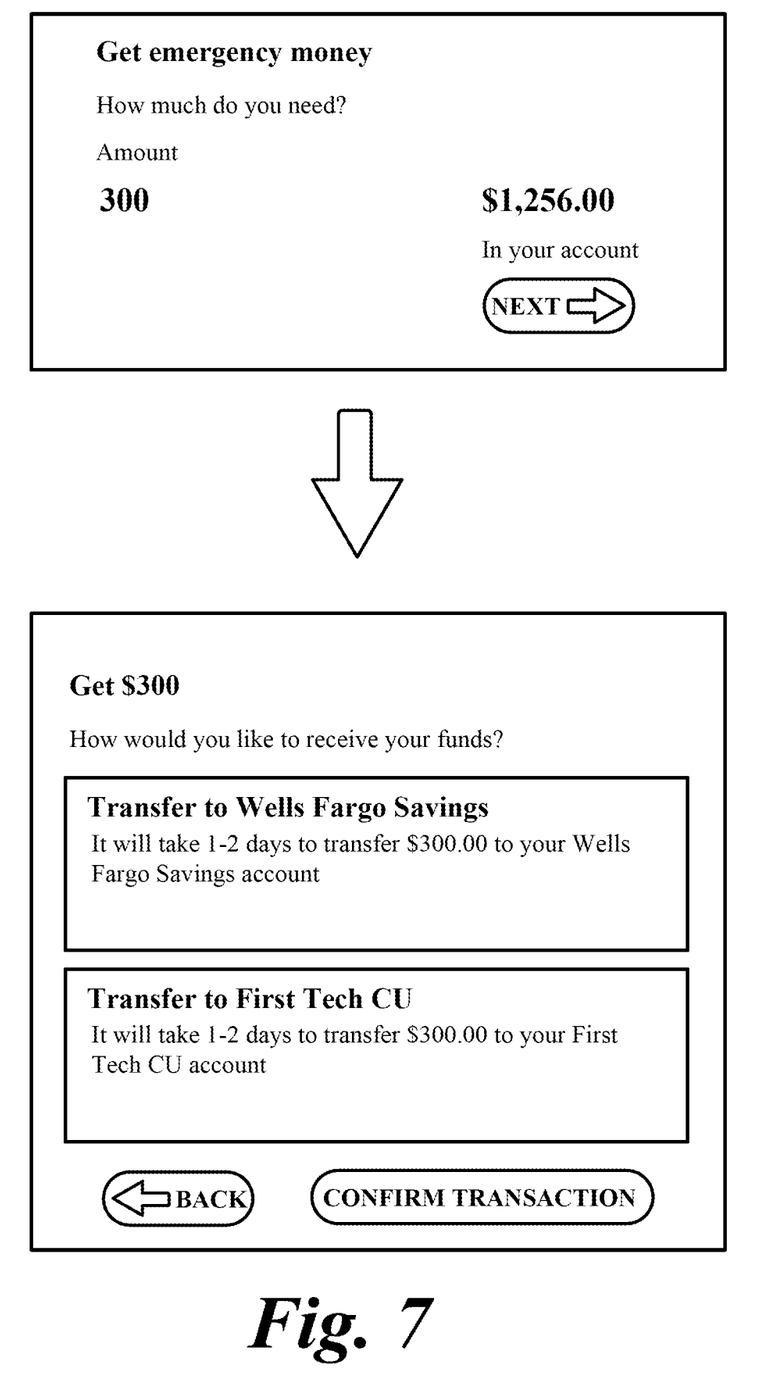
FIG. 7 is a screenshot illustrating features of an embodiment of the invention.

Referring to FIG. 7, and in an embodiment, all funds held in balance in the default account as part of the program can be accessed at any time, for any reason and without any delay or cost to the employee. Funds are made available to the employee in the timeframe and in the method chosen by the employee. All funds are available to the employee as well if employment with the sponsor is terminated.

Figure 9:
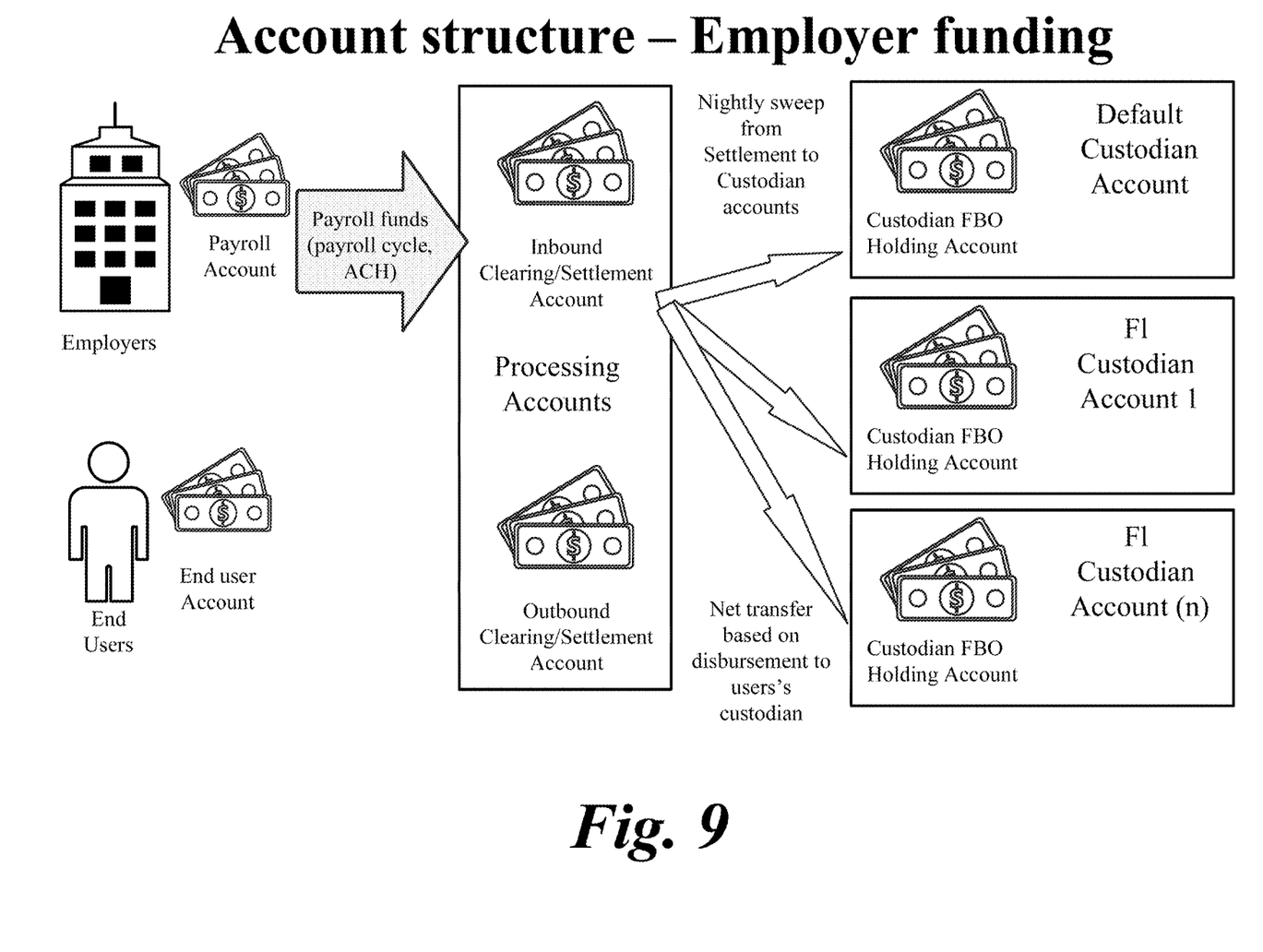
FIGS. 9-10 illustrate fund flow according to an embodiment of the invention.
Figure 10:
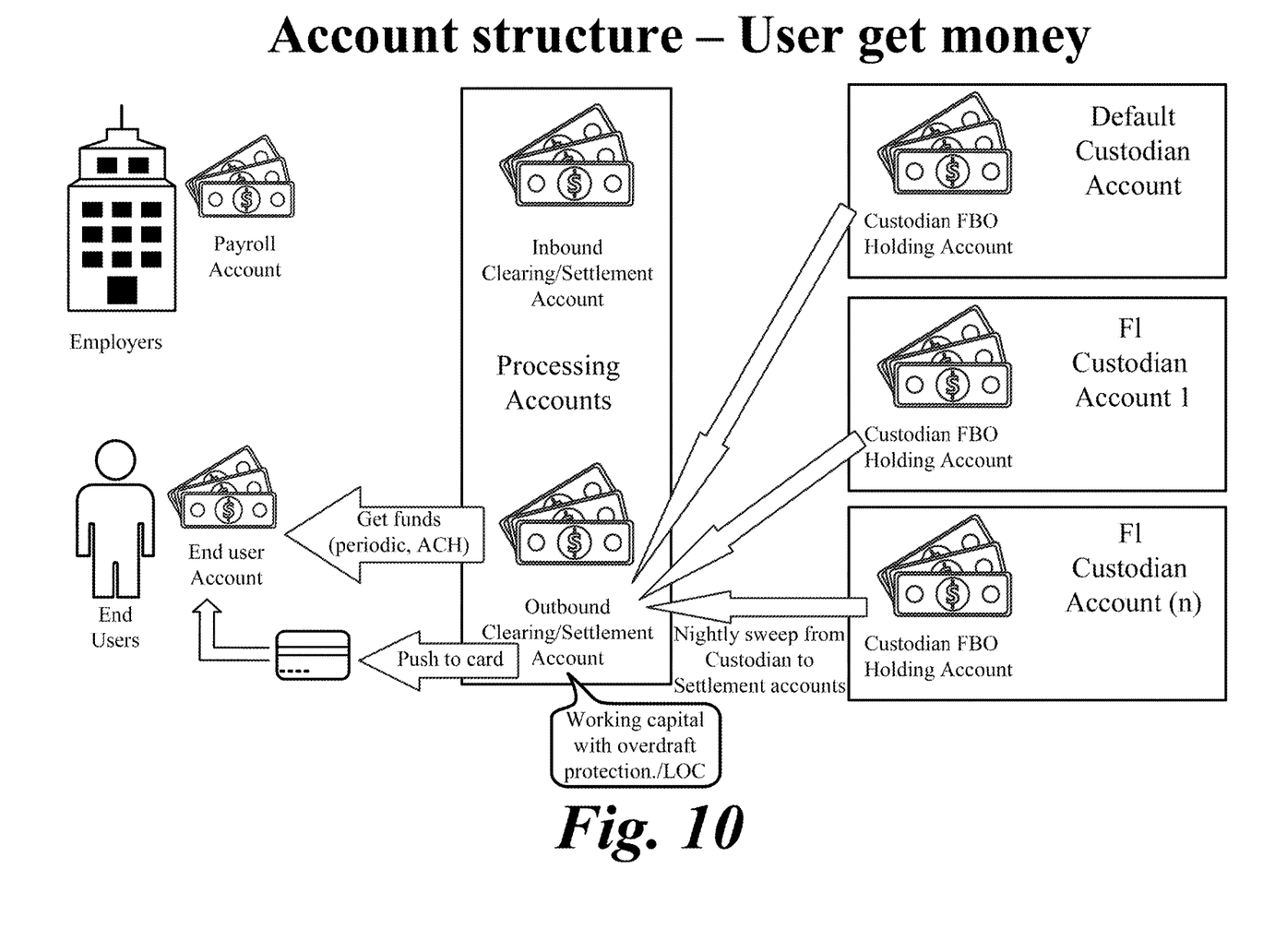

FIGS. 9-10 illustrate fund flow according to an embodiment of the invention.

While the preferred embodiment of the invention has been illustrated and described, as noted above, many changes can be made without departing from the spirit and scope of the invention. For example, an embodiment may specifically exclude the ability to transfer funds from the FBO account using a debit or credit card so that such a transfer can only be achieved upon request to the administrator. This approach both encourages thoughtful withdrawal requests on the part of the employee and reduces the possibility of theft/fraud associated with relying on a third-party to effect such a transfer. Accordingly, the scope of the invention is not limited by the disclosure of the preferred embodiment. Instead, the invention should be determined entirely by reference to the claims that follow.

What is claimed is:

1. A system operable to interface with a plurality of payroll systems, each payroll system being associated with an employer, to establish emergency savings plans for employees of the employer, the system comprising:
   a database; and
   a server communicatively coupled to the database and operable to:
       establish a first communication link with a first of the payroll systems: enroll the employer associated with the first payroll system by requesting employer information of the employer, said employer information including an account of a financial institution used by the employer for payroll purposes, a routing number of the account, and employee information of the employer;
       validate the employer information;
       store the employer information in a first data structure of the database;
       provide an interface to a first employee of the employer through a second communication link to enroll the first employee in the emergency savings plan of the employer;
       process employee information received from the first employee, said employee information including an account of a financial institution used by the first employee, and a routing number of the account of the employee;
       validate the first employee based on the employee information of the employer;
       establish a profile of the first employee based on the received employee information upon validation of the first employee;
       store the profile of the first employee in a second data structure of the database;
       link the second data structure to the first data structure in the database;
       automatically manage an employer match of a payroll deduction amount by linking the first employee to the employer;
       request that the first employee input the payroll deduction amount, through the interface, to be deposited into the emergency savings plan of the employer;
       automatically receive the payroll deduction amount each time the first employee is paid by the employer;
       deposit the payroll deduction amounts into a financial account associated with the system;
       present a savings goal recommendation to the first employee through the interface based on historical fund transfers to the first employee;
       process a request to implement a savings goal from the first employee based on the presented savings goal recommendation;
       automatically transfer payroll deductions of the first employee to a long term savings account of the first employee when the first employee exceeds the savings goal in the emergency savings plan of the employer;
       continuously update a record of funds of the first employee in the financial account associated with the system;
       process a request from the first employee for a transfer of at least a portion of the funds from the financial account associated with the system;
       compare the requested funds to the maintained record to determine if an amount of funds in the financial account associated with the system exceeds the amount of the requested funds;
       transfer the requested funds to the first employee when the amount of funds in the financial account associated with the system exceeds the amount of the requested funds:
       prompt the user to establish a reason for requesting the funds; and
       process a response to the prompt comprising categorizing the response in a user-accessible chart of reasons for requesting the funds, displaying to the first employee how transferred funds of the first employee are being used, and managing the funds of the first employee in the emergency savings plan of the employer.

2. The system of claim 1, wherein:

the server is farther operable to, based on the historical fund transfers to the first employee, automatically calculate funds that the first employee will require for various categories of emergencies to recommend the savings goal.

3. The system of claim 1, wherein:

the server is further operable:

to detect a residence location of the first employee from the profile; and to automatically determine whether the first employee should be in an opt-in program or an opt-out program with respect to the emergency savings plan of the employer based on state regulations of the residence location.

4. The system of claim 1, wherein:

the server is further operable to provide the first payroll system with an option to contribute additional funds to the emergency savings plan of the employer on behalf of the first employee.

5. The system of claim 1, wherein:

the server 1s further operable to:

periodically monitor changes made to the emergency savings plan of the employer, including employment of the first employee, transactions made by the first employee, and employee information of the first employee; and to update the profile of the first employee in the second data structure of the database with each change.

6. The system of claim 1, wherein:

the server is further operable to provide the emergency savings plan to varying payrolls of the first payroll system.

7. The system of claim 1, wherein:

the server is further operable to provide a loan to the first employee as part of the emergency savings.

* * * * *